March 13, 1934.  W. J. BLANCHARD  1,951,321
BLADE RETENTION DEVICE
Filed Jan. 3, 1931
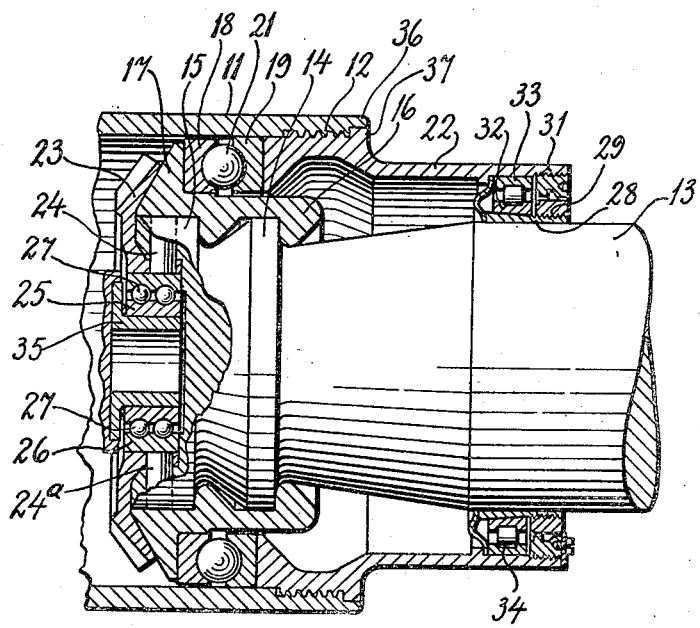
INVENTOR
WERNER J. BLANCHARD
BY
ATTORNEY Patented Mar. 13, 1934

1,951,321

UNITED STATES PATENT OFFICE 1,951,321

BLADE RETENTION DEVICE

Werner J. Blanchard, Hempstead, N. Y., assignor to Curtiss Aeroplane & Motor Company, Inc., a corporation of New York Application January 3, 1931, Serial No. 506,402

5 Claims. (Cl. 170—173)

My invention relates to propellers for aircraft and is more particularly concerned with propellers having controllable or variable pitch blades.

The propeller described herein is an improvement of the propeller described in my copending application Serial Number 334,674. In said copending application I described a propeller having a blade which is adjustable as to pitch but which cannot be varied as to pitch or controlled while in operation. Prior to my invention the usual type of variable pitch propeller proposed was one in which the hub itself was split longitudinally for the insertion and retention of the butt end of the blades.

One of the objects of this invention is to provide a strong structure including an unsplit hub capable of retaining the butt end of the blades of the propeller and at the same time capable of allowing the rotation of the blades about their longitudinal axes in order to vary the pitch setting of said blades.

A further object of the invention is the provision, in such structure, of coacting parts so arranged that it will not be necessary to provide threads upon the duralumin blade of the propeller.

A further object of the invention is to provide such a structure adapted for the use of propeller blades formed with butt ends of the standard shape approved by the Department of Commerce.

A further object of the invention is to provide a structure having the above characteristics but in which the overall length of the hub need be only relatively small.

Further objects will be apparent from a reading of the subjoined specification and claims and from a consideration of the accompanying drawing.

In order to explain the invention more clearly, one embodiment thereof is shown in said drawing, in which:

The figure is a view in vertical section of a part of the hub portion and blade of a propeller constructed according to my invention.

Therein I have shown a cylindrical hollow hub 11 having substantially straight sides internally threaded as at 12. By reason of the construction of the hub with straight sides I am able to increase the strength of the hub and to keep the air resistance of the hub at a minimum. A more important advantage of the straight side construction is the ease and economy of machining a hub with straight sides as compared with the difficulty and cost of machining a hub with sloping or irregular sides. Inserted within the cylindrical opening or socket of the hub is the butt end of a propeller blade 13 formed with standard shaped shoulders 14 and 15.

In order that the blade may be rotatably retained within said cylindrical hub opening, I have provided a split ring or sleeve 16 which is made in two or more sections in order that it may be assembled over the shoulders 14 and 15 of the blade 13. The split ring 16 is provided with shoulders to coact with the shoulders 14 and 15 of the blade 13 and is provided adjacent to the inner end of said blade with an outwardly extending flange 17. Surrounding said ring and positioned outwardly from said flange is a bearing ring comprising ring sections 18 and 19 and ball bearings such as 21. In operation of the propeller centrifugal force acting upon the blade 13 tends to force the split ring 16 outward and cause the offset flange 17 to bear upon the section 18 of the bearing ring. Bearing upon the section 19 of the bearing ring is a nut 22 which is exteriorly threaded and screwed into the threads 12 of the hub 11. The bearing ring comprising the parts 18, 19 and 21 serves as a thrust bearing for taking centrifugal loads imposed during the rotation of the blade with the hub as said parts rotate to propel the aerial vehicle. Moreover, said bearing ring surrounding the split ring 16 as it does, serves to hold the split ring in assembled relation with the butt end of the blades. It is to be especially noted, moreover, that the design, whereby the bearing ring bears on a flange at the inner end of the split ring and whereby the nut 22 extends inward beyond the outer end of the split ring, materially reduces the overall length of the hub.

I provide means for turning the propeller blade about its longitudinal axis to vary the pitch of the blade. Adjacent to the inner end of said blade I insert a bevel gear 23 which projects into the cylindrical hollow portion at the inner end of said blade and is secured to the inner end of said blade by means of pins such as the pins 24 and 24ª. Thus, the bevel gear cooperates as if it were a substantially integral part with the propeller blade. A cooperating bevel gear (not shown), adapted to mesh with the bevel gear 23 in a manner previously known in the art rotates said bevel gear and thus rotates the propeller blade to vary the pitch thereof, I also provide bearings at longitudinally spaced points for taking side thrust upon the propeller blade. Adjacent to the inner end of said blade there is provided a bearing ring 25. Adjacent to said ring 25 is a cooperating ring 26 which, together with the ring 25, and the ball bearings 27, form a bearing for taking side thrust at the inner end of said blade. The ring 25 is adapted to bear on a central post or internal projection 35 secured to or formed integrally with the hub 11. Adjacent to the outer end of the nut 22 which extends outward along the blade length a substantial distance, I have provided a wedge-shaped or annularly tapered sleeve 28 which surrounds the propeller blade adjacent thereto. This sleeve is exteriorly threaded as at 29 and the outer end of the nut is interiorly threaded as at 31. A ring 32 screwed on to the threads 29 of the sleeve 28, a ring 33 screwed into the threads 31 of the nut 22, and roller bearings such as 34 positioned between said rings cooperate to form a thrust bearing for taking side thrust at this portion of the propeller blade.

The hub 11 is formed adjacent to its outer ends with an extension 36 formed with a slightly enlarged internal diameter and the nut 22 is formed with a portion 37 having an enlarged external diameter that coacts with the extension 36 to position the butt end of the blade, the split sleeve and the nut at the proper position and the proper distance within the hub 11. A suitable pin or key of conventional type may be passed through suitable openings formed in the nut 22 and in the hub 11, to hold them from movement with respect to each other after the nut has been screwed within the hub.

In the assembly of my improved propeller the bearing comprising the rings 32 and 33 and the rollers 34 is first slipped on the propeller blade from the butt end. Thereafter, the conical sleeve 28 is similarly slipped on the propeller blade. Next the nut 22 is similarly slipped on the butt end of the propeller blade. Thereafter, the bearing comprising the rings 18 and 19 and the balls 21 is slipped on the butt end of the propeller blade. The above parts are pushed outward along the propeller blade to a position in which they will not interfere with the assembly of the other parts. Thereafter the bevel gear 23 is secured to the inner end of said propeller blade. The bearing formed by the rings 25 and 26 and the balls 27 is next inserted. Thereafter, the split ring 16 is assembled around the inner end of the propeller blade. The bearing comprising the rings 18 and 19 and the balls 21 is next pushed back down to surround the split ring 16 to bear upon the flange 17 thereof. The inner end of the blade, together with the assembled bevel gear and bearings is inserted within the cylindrical socket of the hub 11. Next, the nut 22 is drawn inward and screwed into the hub 11, forcing the bearing 18—19—21 against the flange 17 of the split-ring 16 and thus forcing the blade inward of said hub. Next, the wedge-shaped sleeve 28 and the bearing comprising the parts 32—33—34 are drawn inward and the rings 32 and 33 are screwed into the threads 29 and 31. This completes the assembly of the blade within the hub. The blade may, of course, be assembled in other ways. For instance, the bearing 18—19—21 need not be pushed down on the split ring 16 until the inner end of the blade has been inserted within the hub.

It is to be understood that the above described embodiment of the invention is for the purpose of illustration only, and various changes may be made therein without departing from the spirit or scope of the invention.

I claim as my invention:

1. In a variable pitch aeronautical propeller, a hub having a socket, a blade end adapted to be inserted within said socket, an anti-friction bearing for assuming side thrust loads between said blade end and an internal projection formed in said hub, an extension for said hub extending outwardly around said blade, an anti-friction bearing for assuming side thrust loads between said blade and said extension, and means associated with said extension for holding said bearing in adjustably fixed relation along said blade.

2. In a variable pitch aeronautical propeller, a hub having a socket, a blade adapted to be inserted within said socket, an extension on said hub having internal threads formed at the outer end thereof, a bearing race inserted in the hollow of said extension, an externally threaded nut engaging said internal threads for holding said race within said extension, a tapered sleeve surrounding said blade, said sleeve, at the smaller end thereof, having threads formed thereon, a bearing race adapted to surround said tapered sleeve, and having an inner surface complementary to the taper of said sleeve, a nut engaging the threads on said sleeve for drawing said sleeve within said last mentioned race, and anti-friction devices between said bearing races.

3. In a variable pitch aeronautical propeller, a hub having a socket, a blade adapted to be inserted within said socket, bearing means within said socket for holding said blade against centrifugal force, and a bearing for assuming side loads, between the outer end of said socket and the shank of said blade, comprising an annular tapered sleeve surrounding said blade shank, a bearing race surrounding said sleeve having a taper complementary to and engaging with said sleeve taper, said race having bearing relation with said socket, and means for translating said sleeve with respect to said race.

4. In a variable pitch aeronautical propeller, a hub having a socket, a blade adapted to be inserted within said socket, bearing means within said socket for holding said blade against centrifugal force, and an anti-friction bearing for assuming side loads, between the outer end of said socket and the shank of said blade including a translatable tapered sleeve associated with said bearing for adjusting the position thereof on said shank.

5. In a variable pitch aeronautical propeller, a hub having a socket, a blade adapted to be inserted within said socket, bearing means within said socket for holding said blade against centrifugal force, and an anti-friction bearing for assuming side loads, between the outer end of said socket and the shank of said blade, said bearing including means to adjust the position thereof on said shank.

WERNER J. BLANCHARD.